United States Patent [19]

Kim

[11] Patent Number: 5,607,494
[45] Date of Patent: Mar. 4, 1997

[54] ARTIFICIAL SOIL COMPOSITION AND A METHOD OF GROWING VEGETATION ON A SLOPED SURFACE

[76] Inventor: Young K. Kim, 481-5 Galhyun-dong, Eunpyung-gu, Seoul, Rep. of Korea, 122-050

[21] Appl. No.: 97,888

[22] Filed: Jul. 28, 1993

[51] Int. Cl.$^6$ .............................. C05F 11/02; C05F 11/08
[52] U.S. Cl. ........................ 71/6; 71/24; 71/903; 71/904; 47/58
[58] Field of Search ................................... 71/1, 24, 6, 7, 71/903, 904; 47/58

[56] References Cited

U.S. PATENT DOCUMENTS

| | | | |
|---|---|---|---|
| 3,824,092 | 7/1974 | Wilkstrom | 71/24 |
| 4,099,345 | 7/1978 | Loads | 71/24 |

FOREIGN PATENT DOCUMENTS

| | | | |
|---|---|---|---|
| 0035153 | 7/1982 | Japan | 71/9 |
| 28654 | 11/1985 | Rep. of Korea . | |
| 60506 | 9/1989 | Rep. of Korea . | |
| 2246566 | 5/1992 | United Kingdom | 71/9 |

*Primary Examiner*—Ferris Lander
*Attorney, Agent, or Firm*—Jacobson, Price, Holman & Stern, PLLC

[57] ABSTRACT

An artificial soil composition and a method of growing vegetation on a sloped surface, especially a cut rock surface are disclosed. The artificial soil composition includes peat, granular soil, sewage sediment formed by the treatment of urban waste for example and pulp sludge formed by the de-watering of fibrous material and is a byproduct of the manufacture of paper from wood pulp. The artificial soil composition is applied over a meshing which is secured over a sloped cut rock surface. Plants are grown in the layer of artificial soil. Experimentally, the artificial soil is shown to have an increased adhesion to the inclined surface compared to natural soil, promotes plant growth and retains water to a greater extent than natural soil but does not cause an environmental hazard resulting from the leaching of compounds in the run-off water.

The preferred concentrations of the constituents by weight are: peat (10–30%) granular soil (10–30%) sewage sediment (40–60%) and pulp sludge (25–44%).

8 Claims, 1 Drawing Sheet

ARTIFICIAL SOIL COMPOSITION AND A METHOD OF GROWING VEGETATION ON A SLOPED SURFACE

FIELD OF THE INVENTION

This invention relates to an artificial soil composition and a method of growing vegetation on a sloped surface, and in particular on a surface of cut rock.

BACKGROUND OF THE INVENTION

On the surface of a slope of cut earth or rock where the environment for growing vegetation is poor, applying soil of a suitable thickness onto the slope will improve the ability of vegetation to be grown thereon. For landscaping a sloped rock area, latticed block has generally been used. Soil fills the compartments of the latticed block and then lawn is planted in the soil. This conventional method can only be used on a sloped surface having a small incline and is generally not suitable for use on a steep slope having a particularly irregular surface of cut rock. Also, transportation and installation of the latticed block to the sloped surface is very difficult. After installation, the latticed block may slide down under gravity.

Installation of a wire mesh with a soil layer over the cut rock surface has also been tried. However the moisture retaining capacity of the soil is very limited and therefore the soil layer generally must be greater than 30 cm to retain moisture therein. Accordingly, a large amount of soil is required. Heavy equipment for high pressure spraying ... is also required. After application of the layer of soil, the soil has a tendency to erode as a result of insufficient adhesion between the surface of the cut rock and the soil.

SUMMARY OF THE INVENTION

This invention has been designed to overcome the problems described above. The artificial soil composition of the invention efficiently covers the rough surface of the cut rock and only a relatively thin layer of the artificial soil is required which can be applied with moderately sized construction equipment. The artificial soil of the invention has improved adhesion to the surface of cut rock and accordingly undesirable erosion of the soil after installation can be prevented.

The artificial soil composition includes; a) peat, b) sewage sediment, c) pulp sludge, and d) granular soil. Other material such as microbes may be added to the composition as desired.

The invention also relates to a method of growing vegetation on a sloped surface comprising the steps of a) affixing a meshing over the sloped surface, b) applying the artificial soil as defined in the preceding paragraph over the mesh so as to form a layer of artificial soil and c) planting vegetation in the layer of artificial soil.

BRIEF DESCRIPTION OF THE DRAWINGS

The preferred form of the invention will now be described with reference to

DETAILED DESCRIPTION

Figure 1:
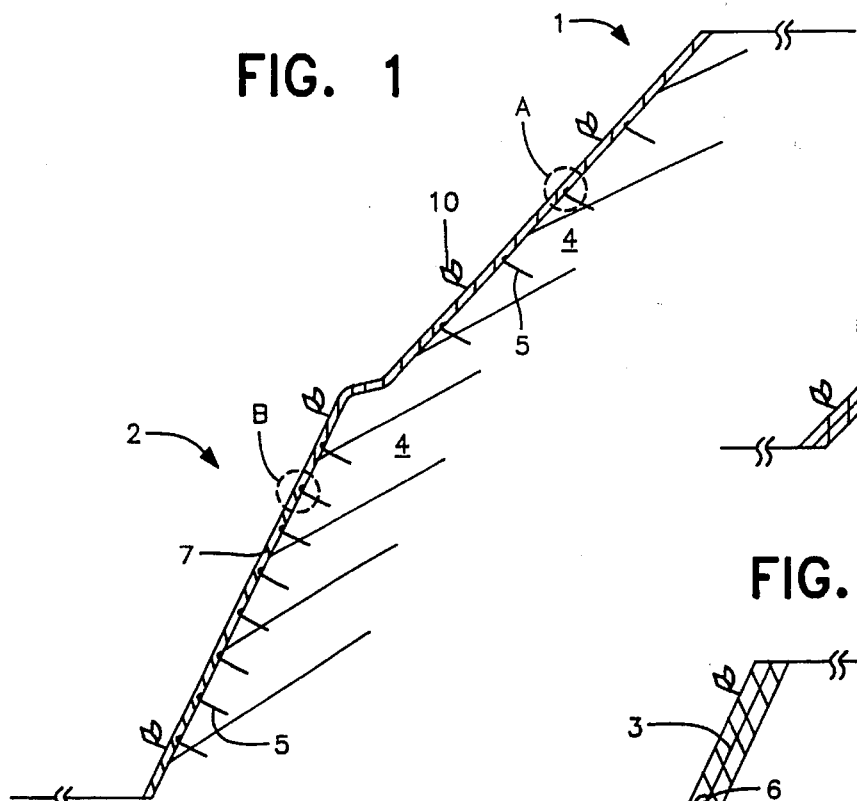
FIG. 1, which is a sectional side elevation of a sloped surface covered by the artificial soil composition according to one preferred embodiment of the invention.

In a first aspect the invention relates to an artificial soil composition comprising a) peat, b) sewage sediment, c) pulp sludge and d) granular soil.

"Peat" can be derived from a peat bog or swamp for example and consists of water saturated, partially decayed plant matter which provides organic matter, nitrogen and phosphorus compounds e.t.c. in the artificial soil.

The "sewage sediment" referred to herein is the precipitate formed in the neutralization process during sewage treatment and contains predominantly organic matter. The sewage sediment can be obtained from urban sewage treatment plants for example. The de-watered sediment is a suitable environment for growth of microbial organisms. Desirably, the chemical makeup of the sewage sediment is: organic material about 42% to 68% by weight; total nitrogen about 1–5% by weight; phosphorous (i.e. in the form of $P_2O_5$) about 1–7% by weight; potassium (i.e. in the form of $K_2O$) about 0.5–2% by weight; calcium (i.e. in the form of CaO) about 0.5–7% by weight and magnesium (i.e. in the form MgO) about 1–6% by weight. Other material such as inorganic material (e.g. sand) may be present in a range of 40–50% by weight. The sewage sediment may have a pH of between about 5.8 to 7.1. In an analysis report published by the Agricultural Technology Institute of the Republic of Korea the average chemical makeup of sewage sediment was found to be; organic material (45.8%), total nitrogen (1.42%), phosphoric acid (1.15%), potassium (0.28%), calcium (6.21%), magnesium (1.12%), inorganic material e.g. sand, etc. (44.02%). It is envisaged that the sewage sediment used to make the artificial soil composition could have a similar chemical makeup to this. However, the concentration of the constituents of the sewage sediment can obviously be varied within the scope of the invention. The sewage sediment provides nutrients (e.g. nitrogen and phosphorous) for stimulating growth of microbes existing therein such as filamentous fungi and other bacteria. By utilizing this industrial waste, the invention provides a solution to the environmental problem associated with disposal of these wastes.

The "pulp sludge" referred to herein is produced by de-watering fibrous material and is a byproduct of the manufacture of paper from wood pulp for example. However, other sludge products including cellulose and lignin are also contemplated with the scope of the invention. This pulp sludge should be decomposed in the presence of suitable microorganisms before it is included in the artificial soil composition. Decayed pulp sludge generally has the same constituents and properties as peat and provides a source of carbon as well as microbes. Pulp sludge includes lignin and hemicellulose which are relatively slow to decompose and hence increase the viscosity and adhesiveness of the artificial soil. Desirably, the pulp sludge has a pH range between about 5.7 to 8.5 and may have a chemical makeup of: organic matter about 12–49% by weight; total nitrogen about 0.1 to 0.7% by weight; phosphorous (i.e. in the form $P_2O_5$) about 0.05–3% by weight; potassium (i.e. in the form $K_2O$) about 0.1 to 0.4% by weight; calcium (i.e. in the form CaO) about 2.1 to 2.4% by weight; magnesium (i.e. in the form MgO) about 3 to 5% by weight; cellulose about 5 to 8% by weight; and lignin about 15 to 20% by weight. Utilization of pulp sludge reduces the problems associated with the disposal of environmental wastes from the pulp and paper industry.

The average granule diameter of each of the peat, sewage sediment and pulp sludge components may be between about 0.02 mm (i.e. clay) and about 2 mm (i.e. sand). Preferably, less than 20% of the granules of the composition have diameters of 0.02 mm or less. While diameters of greater than 20 mm are acceptable, it may be desirable to crush these larger particles.

The "granular soil" comprises coarse grained soil including decomposed granite, volcanic ash or coal ash, or a combination of these. The granular soil may be derived from mountain or earth excavation sites and the particles of the granular soil may have diameters which range from about 0.02 mm to 20 mm. Desirably, 5% or less by volume of the particles have a diameter of 20 mm or greater and hence it may be desirable to crush the larger particles so that the composition is able to be sprayed.

The ratio of each of the components of the composition can be readily varied depending on the desired consistency of the artificial soil. However, the recommended concentration of each of the components is as follows:

a) peat between about 10 to 30% by weight;

b) granular soil between about 10 to 30% by weight;

c) sewage sediment between about 40 to 60% by weight, and d) pulp sludge between about 25 to 45% by weight.

Microbial organisms may be present in the constituents (e.g. in the sewage sediment or the pulp sludge) or may be added to the composition as desired. Microbes that can be added to the composition include Aspergilli fungi, Mucor fungi, Bacillus bacteria or Pseudomonas bacteria for example.

Figure 2:
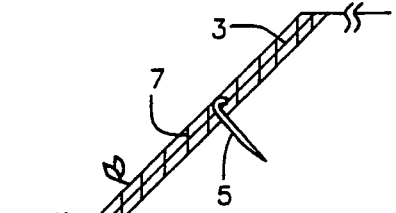
FIGS. 2 and 3 which respectively show exploded views of details A and B of FIG. 1.
Figure 3:
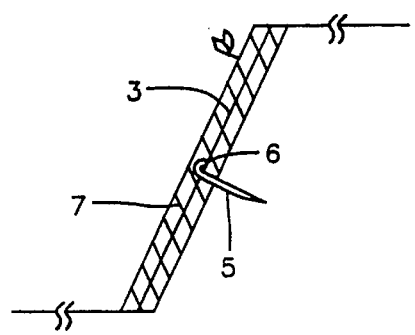
Figure 4B:
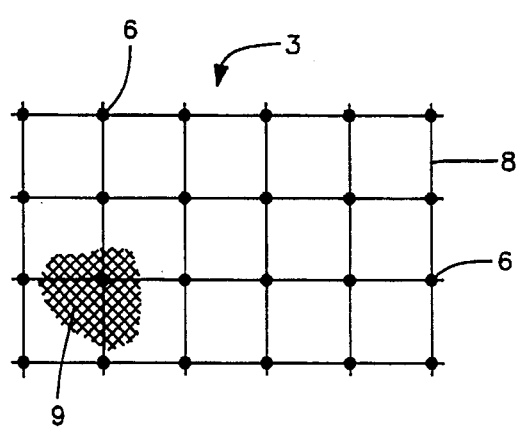
FIGS. 4a and 4b which are top elevations of the meshing for use on the slope of FIG. 2 and FIG. 3 respectively.
Figure 4A:
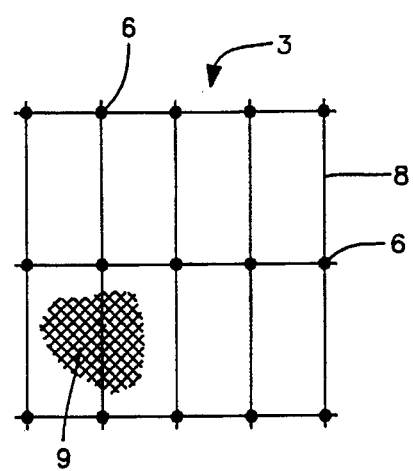

The method of growing vegetation on a sloped surface shall now be described in more detail with reference to FIGS. 1 to 3. FIG. 1 shows a sloped surface with a section 1 which shows a soft rock or weathered rock base having a slope of under 1:0.5 for example and a steeper section 2 having a hard rock base with a slope of under 1:0.3 for example. A meshing 3 is positioned on the sloped surface 4 of soft rock, weathered rock or hard rock. The meshing 3 can be wire mesh for example or for gentle slopes may be polyethylene net. With reference to FIGS. 4a and 4b, the meshing 3 employed in the preferred embodiment of the invention is formed from PVC coated wire forming a frame work 8 which comprises a plurality of squares (see 4b) or rectangles (see 4a) on which a finer cross hatched meshing 9 (also formed from PVC coated wire) is positioned or to which the meshing 9 is secured. Each square at the frame work 8 may have vertical and horizontal sides of 150 cm by 150 cm as shown in FIG. 4b for steeper slopes or the rectangles of FIG. 4a may have horizontal sides of 150 cm and vertical sides of 300 cm for gentler slopes. Of course, many different embodiments of the meshing are contemplated. To secure the meshing to the sloped surface a plurality of anchor members 5 each having a hook-shaped end 6 may be driven into the sloped surface to a depth of about 20 to 40 cm with the hook end 6 securing the meshing 3. In the embodiment of FIGS. 4a and 4b, anchors 5 are provided at each intersection between the horizontal and vertical wires of the frame work 8. Extra securing pins may be used to secure the finer meshing 9 as required. As shown in FIG. 1, it may be necessary to use more anchor members 5 where the slope is fairly steep (see section 2). The artificial soil composition described herein is then applied over the secured meshing 3 to form a layer 7 of artificial soil. Conveniently, the artificial soil composition may be sprayed onto the meshing using a high pressure spraying device so that a layer of artificial soil of about 5–20 cm in depth is achieved. In the embodiment shown, the steep area of section 2 has a layer 7 of artificial soil of about 15 cm while the gentler slope of section 1 has a layer 7 of artificial soil of about 10 cm. Vegetation 10 is then able to be grown in the layer of artificial soil using techniques known in the art. In a desirable embodiment of the invention, the artificial soil and the seeds for growing vegetation are mixed together and then the soil/seed mixture is sprayed onto the meshing 3.

A non-limiting example of a composition which was made according to the invention claimed herein follows:

EXAMPLE 1

Preparation of an Artificial Soil Composition and Suitability thereof for Supporting Plant Growth An artificial soil composition was produced by mixing a concentration of peat from between 10 to 30% by weight, granular soil from 10 to 30% by weight, sewage sediment from 40 to 60% by weight and pulp sludge from 25 to 45% by weight. After addition of water, grass seeds and weed seeds to the artificial soil, the composition was mixed and sprayed onto a wire mesh which had been fixed in place over the inclined surface of cut rock using an anchor. The thickness of the artificial soil layer applied to the mesh ranged from about 5 to 20 cm. Even after exposure to heavy rain the artificial soil layer was stable and did not erode. The artificial soil was able to retain enough moisture so that plants grown therein survived for the period of the study (i.e. three months). The pH of the artificial soil composition was 7.2 and its density was 1,000 to 1,050 g/l which was approximately 0.57 to 0.6 times the density of natural soil (i.e. 1,750 g/l). Because of the reduced weight of the artificial soil, use of a moderately sized applicator machine and easy transportation of the artificial soil were possible. The high porosity of the artificial soil (42 to 44%) which was 1.07 to 1.12 times higher than natural soil (39%) and 1 to 1.05 times higher than granular soil (42%) resulted in early sprouting of seeds and rapid plant growth.

In order to measure the moisture retaining capacity of the artificial soil the following experiment was performed.

EXAMPLE 2

Test of Moisture Retaining Capacity—Natural Soil and Artificial Soil Composition Two roofing slates (sized 50 cm×50 cm) were installed at an inclined angle of 40° to horizontal in a greenhouse. Natural soil was provided over a wire mesh in one slate and the artificial soil composition of Example 1 was provided over the wire mesh of the other slate. The soil layers were each about 10 cm thick. Ten grams of perennial rye-grass seeds which had been soaked for 24 hours in water, were planted and one liter of water was poured evenly over each bed. No further water was added thereafter. After four days, seeds had begun to sprout from each bed of soil. The grass on the bed of the natural soil started to dehydrate from the seventh day onwards and died on the 12th day after planting. However, the grass on the bed of artificial soil started to dehydrate only after the 120th day and died on the 140th day after planting. Moisture retaining capacity of the artificial soil composition was accordingly 28 times greater than that of natural soil.

In order to assess the environmental impact of the artificial soil, the following experiment was performed:

EXAMPLE 3

Environmental Impact of Artificial Soil Composition

Run-off water taken from the base of a sloped area covered by the artificial soil of Example 1 and planted with vegetation was collected after the first rain fall and the BOD (Biological Oxygen Demand) suspended solids, oil and grease concentration, settleable solids concentration, total dissolved solids concentration, chloride and sulfate concentrations, total nitrogen and nitrates and nitrite concentrations as well as the pH of the water were measured. The results of the tests are given in the following table. The effluent limits, which must not be exceeded to avoid pollution of the environment, are shown in the right hand column.

TABLE 1

Environment Impact of Artificial Soil

| Constituent | OUR TEST RESULT | Effluent Limits Discharge to River |
|---|---|---|
| BOD, mg/l | 16.4 | |
| 7-day Average | | 30 |
| 30-day Average | | 20 |
| Suspended Solids, mg/l | 14 | |
| 7-day Average | | 40 |
| 30-day Average | | 15 |
| Oil and Grease, mg/l | 2.5 | |
| 30-day Average | | 10 |
| Maximum | | 15 |
| Settleable Solids, mg/l | 0.07 | |
| 30-day Average | | 0.1 |
| Maximum | | 0.3 |
| Total Dissolved solids, mg/l Maximum | 64 | 950 |
| Maximum Chloride, mg/l | 30 | 150 |
| Maximum sulfate, mg/l | 1.2 | 300 |
| Total Nitrogen, mg/l 30-day Average | 0.5 | |
| Nitrates and Nitrites, mg/l Maximum | 1.7 | 8 |
| pH | 6.8 | 6.0–9.0 |

Accordingly, it can be seen that the concentration of the constituents in the run off water did not exceed the effluent limits and therefore the environmental impact of the artificial is minimal.

The concentration of various components in the artificial soil and natural soil were measured and these are shown in the following table:

TABLE 2

Comparison of Artificial Soil Composition and Natural Soil

| Component | Artificial Soil (Example 1) | Natural Soil |
|---|---|---|
| Organic Material, % | 26.2 | 1.09 |
| Total Nitrogen, % | 2.98 | 0.02 |
| Phosphoric Acid ($P_2O_5$), PPM | 310 | 157.8 |
| Potassium, K(ME/OOG) | 2.45 | 4.48 |
| Porosity, % | 43 | 39 |
| Acidity, pH | 7.2 | 5.1 |

Thus it can be seen that the artificial soil composition of the invention is suitable for application to a sloped surface and in particular a cut rock slope and has a reduced tendency to erode therefrom. There is synergism between each of the components so that the artificial soil is well adapted for growth of vegetation retains moisture well and adheres to the rock surface well but is not associated with the risk of environmental pollution. The artificial soil composition of the invention has a desirable concentration of total nitrogen, phosphorus, calcium and other organic materials so that it provides a good environment for vegetative growth upon the application of a relatively thin layer of the artificial soil (between about 5 to 20 cm) onto a sloped surface.

What is claimed is:

1. An artificial soil composition for supporting vegetative growth which is suitable for application to a sloped surface comprising:

(a) peat in a concentration range of between about 10% to 30% by weight;

(b) granular soil in a concentration range of between about 10% to 30% by weight;

(c) a sewage sediment in a concentration range of between about 40% to 60% by weight;

(d) a pulp sludge in a concentration range of about 25% to 45% by weight; wherein the pulp sludge has a chemical composition comprising about 12% to 49% by weight organic matter; about 0.1% to 0.7% by weight total nitrogen; about 0.05% to 3% by weight phosphorous; about 0.1% to 0.4% by weight potassium; about 2.1% to 2.4% by weight calcium; about 3% to 5% by weight cellulose; and about 15% to 20% by weight lignin.

2. The artificial soil composition of claim 1 wherein the pH is 7.2 and the density is 1000 to 1050 g/l.

3. The artificial soil composition of claim 1 further comprising microbial organisms selected from the group consisting of Aspergilli or Mucor fungi and Bacillus or Pseudomonas bacteria.

4. The artificial soil composition of claim 1 wherein the granular soil composition is selected from the group consisting of decomposed granite, volcanic ash, coal ash and combination thereof.

5. A method of preparing an artificial soil composition for growing vegetation on a sloped surface comprising:

(a) mixing peat in a concentration range of between about 10% to 30% by weight with granular soil in a concentration range of between about 10 to 30% by weight; a sewage sediment in a concentration range of between about 40 to 60% by weight; and a pulp sludge in a concentration range of about 25% to 45% by weight; wherein the pulp sludge has a chemical composition comprising about 12% to 49% by weight organic matter; about 0.1% to 0.7% by weight total nitrogen; about 0.05% to 3% by weight phosphorous; about 0.1% to 0.4% by weight potassium; about 2.1% to 2.4% by weight calcium; about 3% to 5% by weight cellulose; and about 15% to 20% by weight lignin;

(b) adjusting the pH of the composition to a range of about 6.8 to 7.2;

(c) mixing said composition to obtain a density of 1,000 to 1,050 g/l.

6. The method according to claim 5 further comprising the addition of microbial microorganisms selected from the group consisting of Aspergilli or Mucor fungi and Bacillus or Pseudomonas bacteria.

7. An artificial soil composition for growing vegetation on a sloped surface comprising:

a) peat in a concentration range of between about 10% to 30% by weight;

b) granular soil in a concentration range of between about 10 to 30% by weight;

c) sewage sediment in a concentration range of between about 40 to 60% by weight; and d) pulp sludge in a concentration range of about 25% to 45% by weight; wherein the pulp sludge has a chemical composition comprising about 12% to 49% by weight organic matter; about 0.1% to 0.7% by weight total nitrogen; about 0.05% to 3% by weight phosphorous; about 0.1% to 0.4% by weight potassium; about 2.1% to 2.4% by weight calcium; about 3% to 5% by weight cellulose; and about 15% to 20% by weight lignin; said peat, sewage sediment and pulp sludge each having an average diameter of between about 0.02 to about 2 mm and granular soil having a diameter of about 0.02 to 20 mm.

8. The artificial soil composition according to claim 7 wherein the sewage sediment comprises: (a) about 42 to 68% by weight organic material; (b) about 1 to 7% by weight phosphorous; (c) about 0.5 to 2% by weight potassium; (d) about 0.5 to 7% by weight calcium; (e) about 1 to 6% by weight magnesium; and (f) about 40 to 50% by weight inorganic material.

* * * * *